UNITED STATES PATENT OFFICE.

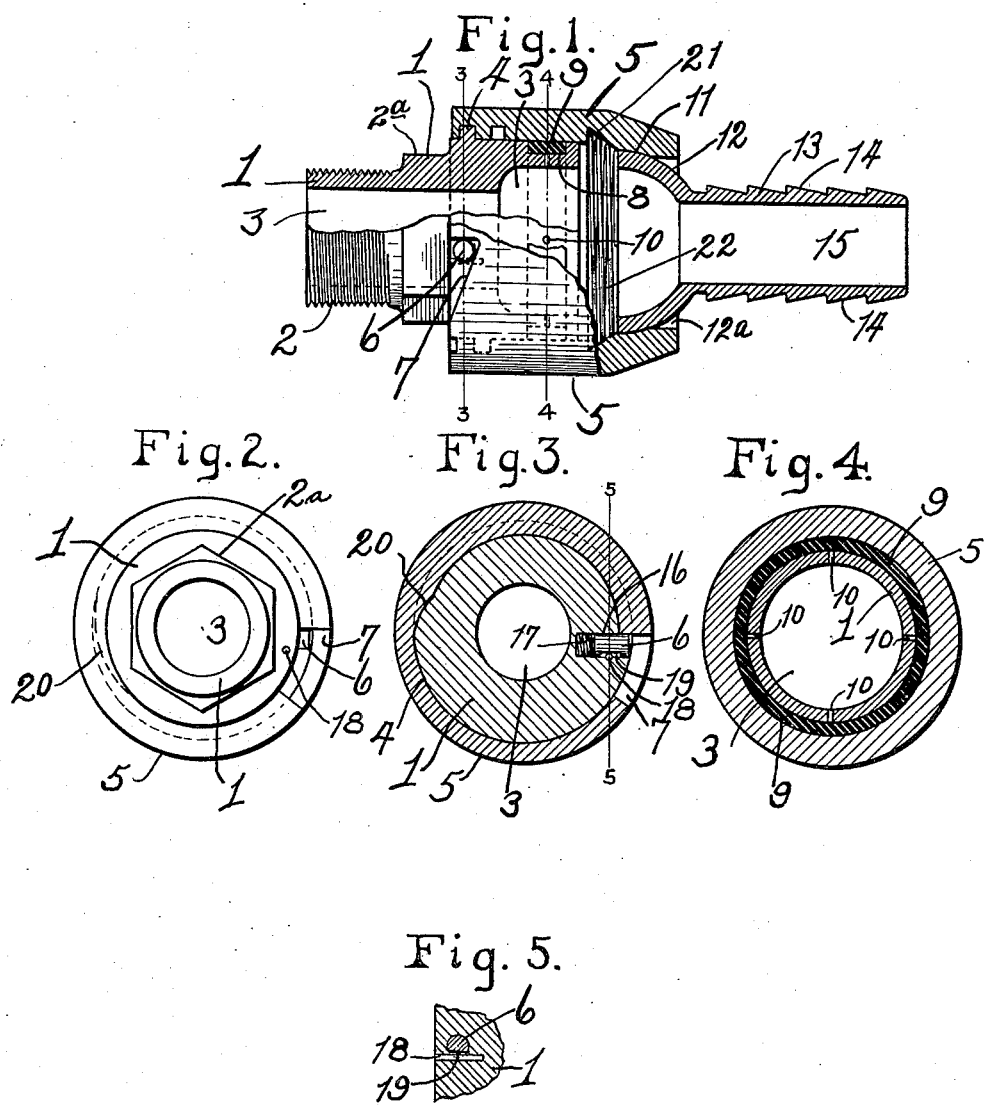

JOHN J. McCARTHY, OF ERIE, PENNSYLVANIA, ASSIGNOR OF FOUR-TENTHS TO ERIE CAR WORKS, INCORPORATED, A CORPORATION OF PENNSYLVANIA.

HOSE-COUPLING.

997,633.  Specification of Letters Patent.  Patented July 11, 1911.

Application filed April 5, 1910. Serial No. 553,527.

*To all whom it may concern:*

Be it known that I, JOHN J. MCCARTHY, a citizen of the United States, residing in the city of Erie, county of Erie, and State of Pennsylvania, have invented certain new and useful Improvements in Hose-Coupling, of which the following is a specification.

My invention relates to a coupling for connecting a hose or other conductor to pipe lines, to machinery, such as riveters and the like, the coupling being suited for the transmission of compressed air, or other medium.

It is the object of my invention to provide a coupling of the nature above described which enables a connection to be quickly and securely attained, which will allow a minimum of leakage, which will not become accidentally disconnected, and which will afford a connection of considerable flexibility, whereby the life of the hose to which it may be attached will be lengthened, and which will facilitate the handling of the same.

For an illustration of one of the forms my invention may take, reference is to be had to the accompanying drawing, in which:

Figure 1 is a longitudinal sectional view, partly in elevation, of one form of my improved coupling. Fig. 2 is an end elevational view of the same. Fig. 3 is a transverse sectional view taken on the line 3—3 of Fig. 1. Fig. 4 is a cross sectional view taken on the line 4—4 of Fig. 1. Fig. 5 is a fragmentary sectional view taken on the line 5—5 of Fig. 3.

Referring to the drawings, it will be found that the coupling comprises three parts, a head or connecting male portion 1, a sleeve or female body portion 5, and a movable joint connection or tail member 13. The male part 1 is provided with external screw threads 2 for connecting the same with a machine, pipe line, or any other suitable member, while the part 13 is provided with a corrugated exterior surface 14 upon which may be secured one end of a hose. These parts are not limited to the forms shown, for in practice these parts will be modified to suit circumstances.

In the male member 1 there is provided a passage 3 for the transmission of the compressed air or other medium; the part 1 has a flattened exterior surface $2^a$, which, if desired, may take the form of a nut, for the application of a wrench. A preferably coarse pitch thread 4 is provided for screwing the male member 1 into the female member 5, the pitch being preferably such that a half turn will bring the part 1 into the sleeve or body portion 5 a sufficient distance for the pin 6 to register with a slot or groove 7, shown inclined, provided in the face of the body or sleeve 5 for the purpose of locking the parts 1 and 5 together, in a manner hereinafter explained. A circumferential groove 8 is provided in the part 1 for holding a flexible gasket 9 of rubber or other suitable material, to prevent leakage between the part 1 and the sleeve or body 5. A plurality of holes or ports 10 is provided under the gasket communicating with the interior of the coupling, so that the pressure of the air or medium transmitted will expand the gasket 9 into intimate contact with the interior surface of the sleeve or body 5.

Approximate one end of the body or sleeve 5, and within the bore of the same, is provided a spherically shaped seat 11 ground to fit the ball or spherical head 12 upon the tail or connector member 13. The ball or spherical part 12 is hollow and communicates with the passage 15, in the part 13. The end of the sleeve or body 5 adjacent the ball seat 11 is enlarged, as shown at $12^a$, to permit of free motion of the connecting portion 13 in any direction. Within the sleeve or body 5 is provided a groove or channel 21 adapted to receive the spiral spring 22 which engages the end of the ball or spherical member 12 to hold the same in engagement with its seat 11.

The pin 6 slides freely in a hole 16 in the part 1, and a spring 17 is confined between the bottom of the hole 16 and the pin 6, forcing the pin outwardly so that in its normal position it projects slightly beyond the surrounding surface of the part 1; but the pin 6 does not project beyond the bottom of the thread in the body or sleeve member 5 which receives the thread 4 upon the part 1, as will appear from Fig. 3. A pin 18 fixed in the part 1 prevents the pin 6 from dropping out of the hole 16, and a channel or flattened portion 19 in the pin 6 permits the pin to be pushed flush with the exterior of the part 1. In screwing the part 1 into the sleeve or body portion 5, the pin 6 is depressed by engaging the inclined surface 20 on the female thread in the sleeve or body portion 5 and thereafter rides on the edge of said thread until the pin 6 registers with the groove 7, whereupon the spring 17 forces the pin 6 outwardly to a position to prevent the unscrewing of the part 1 from the sleeve or body portion 5. The position of the pin 6 when in locking position is of importance, for the reason that it is fully protected, does not project beyond the outlines of the coupling, and is therefore not liable to damage or accidental depression to unlocking position.

In disconnecting the coupling, it is only necessary to depress the pin 6 and rotate the sleeve or body portion 5 a half turn with respect to the part 1.

What I claim is:

1. In a coupling, a female member, a male member coöperating therewith, coarse pitch threads upon said male member and within said female member, said threads engaging each other and by themselves holding said male member and female member together, and a transversely extending pin carried by said male member, said pin engaging and held depressed by said thread in said female member during coupling, said female member having a groove, said pin when released from said thread engaging in said groove and accessible through said groove for depression by an operator.

2. In a coupling, the combination with a female member, a thread therein, a male member, a thread thereon, said threads engaging each other and by themselves holding said female member and said male member together, and a transversely extending pin carried by said male member, said thread in said female member having an inclined surface, said pin adapted to engage said inclined surface and be depressed thereby at the beginning of the coupling movement, said pin held depressed by said thread in said female member during further coupling movement, said female member having a groove into which said pin extends after its passage over said thread, said pin accessible through said groove for depression by an operator.

3. In a coupling, a female member, a male member coöperating therewith, coöperating threads in said female and on said male members engaging each other and by themselves holding said members together, a transversely movable pin mounted in said male member, said pin engaging and held depressed by said attaching thread in said female member during coupling, said female member having a groove into which said pin extends after it has traversed said thread, and a spring in said male member for moving said pin outwardly into said groove.

4. In a coupling, a female member, and a male member coöperating therewith and attached thereto by a thread, a transversely movable pin carried by said male member, said female member having a groove into which said pin is adapted to extend, said pin when extended being of substantially the height of the thread upon said male member.

5. In a coupling, a female member, and a male member coöperating therewith and attached thereto by a thread, a transversely movable pin carried by said male member, a thread in said female member having an inclined surface adapted to be engaged by said pin, said female member having a groove into which said pin is adapted to extend after it has traversed said thread, said pin when extended being of substantially the same height as the thread on said male member.

6. In a coupling, a female member, a male member coöperating therewith and attached thereto by a thread, a transversely extending pin carried by said male member and adapted to be held depressed by a thread in said female member during coupling, said female member having a groove into which said pin extends after it has traversed said thread, a projection on said male member beyond its threaded portion within said female member, said projection having a groove, a gasket in said groove fitting the interior of said female member, and a port communicating with said groove from the interior of the coupling.

7. In a coupling, a female member, a male member coöperating therewith and attached thereto by a thread, a transversely extending pin carried by said male member and adapted to be held depressed by a thread in said female member during coupling, said female member having a groove into which said pin extends after it has traversed said thread, a projection on said male member beyond its threaded portion within said female member, said projection having a groove, a gasket in said groove fitting the interior of said female member, a port communicating with said groove from the interior of the coupling, a connector member having universal joint with said female member, a shouldered internal groove in said female member, and a spring engaging in said groove and pressing against said connector member.

In testimony whereof I have hereunto affixed my signature in the presence of the two subscribing witnesses, this first day of April, 1910.

JOHN J. McCARTHY.

Witnesses:
WM. HAMILTON,
JOHN G. KUHN.